United States Patent [19]

Sprouse

[11] Patent Number: 5,306,577
[45] Date of Patent: Apr. 26, 1994

[54] REGENERATIVE FUEL CELL SYSTEM

[75] Inventor: Kenneth M. Sprouse, Northridge, Calif.

[73] Assignee: Rockwell International Corporation, Seal Beach, Calif.

[21] Appl. No.: 914,273

[22] Filed: Jul. 15, 1992

[51] Int. Cl.5 .............................................. H01M 8/06
[52] U.S. Cl. ...................................... 429/17; 429/19; 429/20; 429/21; 204/DIG. 4
[58] Field of Search .................... 204/DIG. 4; 429/19, 429/20, 21, 17

[56] References Cited

U.S. PATENT DOCUMENTS

| 2,384,463 | 9/1945 | Gunn et al. ............... 204/DIG. 4 |
| 3,475,222 | 10/1969 | Biddick ........................ 429/247 |
| 4,657,829 | 4/1987 | McElroy ......................... 429/19 |
| 5,064,732 | 11/1991 | Meyer ........................... 429/113 |

*Primary Examiner*—Stephen Kalafut
*Assistant Examiner*—M. Nuzzolillo
*Attorney, Agent, or Firm*—H. Frederick Hamann; Harry B. Field; David C. Faulkner

[57] ABSTRACT

A variable pressure passive regenerative fuel cell system is provided wherein both the fuel cell and electrolyzer are designed to operate under variable pressure conditions.

5 Claims, 6 Drawing Sheets

REGENERATIVE FUEL CELL SYSTEM

BACKGROUND OF THE INVENTION

1. Field of the Invention

The present invention relates generally to systems which convert chemical energy into electrical energy and more particularly, in water electrolysis, to the control of the process water used in a fuel cell system including a fuel cell and electrolyzer.

2. Background Art

U.S. Pat. No. 4,657,829, describes a hydrogen/air fuel cell having a water electrolysis subsystem and gas storage system. The electrolysis subsystem comprises a plurality of bipolar cells. Water is introduced into the anode chambers of the electrolysis cells from liquid/vapor separators. Hydrogen and oxygen produced by the cells are fed to liquid/vapor separators. Excess water from the anode chamber and water pumped prototonically across the membrane with the hydrogen ions is separated from the gases with the gases being introduced into respective pressurized storage vessels. Each of the separators contain a float switch which actuates pumps and drain valves to feed water to the electrolyzer. As the oxygen and hydrogen in the pressure vessels are consumed, the pressure drops and a signal from the pressure transducers causes additional water to be electrolyzed to replinish depleated oxygen and hydrogen levels.

The electrolyzer system associated with a fuel cell stack described above is limited, however, by a multiplicity of switching and fluid flow control functions.

It is accordingly an object of this invention to provide a novel, variable pressure passive regenerative fuel cell system defined by an absence of complex operational components.

Other objects and advantages of this invention will become apparent from the following detailed description.

SUMMARY OF THE INVENTION

In general, the invention provides a variable pressure passive regenerative fuel cell system designed to operate under variable pressure conditions (as opposed to constant pressure).

Current state-of-the-art fuel cells have been designed for constant pressure operation primarily because they are usually run as open cycle flow through devices. The same is true for state-of-the-art electrolyzers. Current fuel cell systems maintain all the myriad valves, pressure regulators, pumps, and recirculation fans necessary to operate a constant pressure electro-chemical device. This equipment will severely reduce the reliability, availability, and maintainability of such regenerative fuel cell systems.

The fuel cell system of the present invention overcomes the aforementioned deficiencies by providing in a preferred embodiment:

a) a fuel cell including an anode for receiving hydrogen gas and a cathode for receiving oxygen gas;

b) an electrolyzer for electrolyzing water to produce pure hydrogen and pure oxygen;

c) means to store said hydrogen and oxygen from said electrolyzer;

d) a water storage tank communicating with said fuel cell and said electrolyzer;

e) means to supply water to said electrolyzer for producing hydrogen and oxygen;

f) means for supplying hydrogen gas and oxygen gas to said fuel cell; and g) a fiber packed column structure including a housing communicating with said water storage tank.

DESCRIPTION OF THE PREFERRED EMBODIMENT.

Referring to the Figures, in the fuel cell system 10 of the present invention the gaseous hydrogen and oxygen reactants are located in two light weight storage tanks made from high strength composite material such as carbon-carbon fiber rather than metal alloys. These storage tanks feed a single fuel cell which has located below it a small water tank for collecting the product water from the chemical reaction of the hydrogen and oxygen during system operation. Water from the water tank floods an electrolyzer located directly below the water tank. During recharging operation, the electrolyzer produces gaseous hydrogen and oxygen which subsequently refills the two gas storage vessels.

Figure 1:
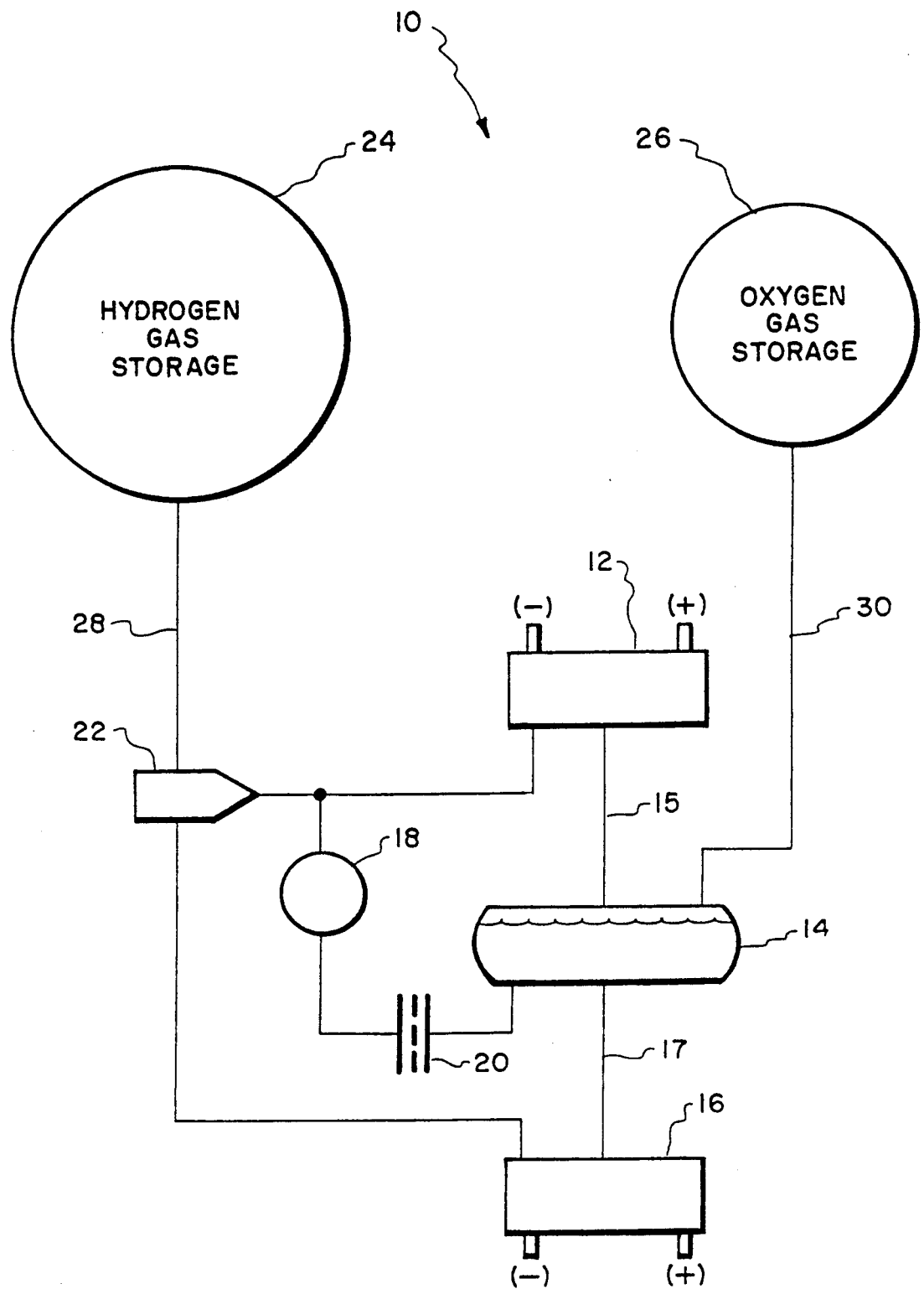
FIG. 1 is a schematic view of the regenerative fuel cell system of the present invention depicting the simplistic configuration of the components thereof.

As seen in FIG. 1, the basic variable pressure passive regenerative fuel cell system 10 comprises a fuel cell 12 which sits on top of a water tank 14, an electrolyzer 16 which sits below the water tank 14, a small secondary water tank 18, a water flow restriction orifice or fluid flow valve 20 communicating with the main water storage tank 14 and the secondary water storage tank 18, a liquid gas separator 22, a gaseous hydrogen storage tank 24, and a gaseous oxygen storage tank 26.

While only one fuel cell is shown, it is to be understood that the fuel cell system of the present invention contemplates the use of a multiplicity of fuel cells designed for delivering 30 kilowatt-hr of electrical energy at a nominal power level of 2.5 kWe (and 120 volts). Each fuel cell includes, as a minimum, an anode chamber having a porous anode, and a cathode chamber having a hydrophobic porous cathode separated by an electrolytic membrane which may be an acid, or a solid polymer such as Nafion, a trademark of E.I. DuPont de Nemours of Wilmington, Del., and which is a polymer of polytetrafluoroethylene with fluorinated ether side chains terminated with sulfonic acid groups.

The electrolyzer includes an anode compartment (not shown) and a cathode compartment (not shown), in which gas and ions are produced and consumed during operation of the system to produce an electrical current. In addition, a central solid proton exchange membrane (PEM), is provided which separates the anode compartment from the cathode compartment. The membrane (not shown) comprises a material which readily permits the transport of ions and solvent between the anode and cathode compartments during operation of the electrolyzer, but which is relatively impermeable to gas.

A hydrogen line 28 from the hydrogen supply tank 24 is connected to both the fuel cell 12 and electrolyzer 16 as shown in FIG. 1. In this configuration, hydrogen is supplied to the anode side of the fuel cell 12 and is extracted from the cathode side of the electrolyzer 16. An oxygen line 30 is attached directly to the water tank 14. From water tank 14, oxygen is transferred to the cathode side of fuel cell 12 through line 15 and opening 64 (See FIG. 5). The fuel cell, water tank, and electrolyzer are stacked vertically as shown in the Figures so that the liquid water produced at the fuel cell's cathode (where electrons are consumed) is concurrently directly drained into the water tank through line or conduit 15 and opening 64 from the cathode side of the fuel cell 12 by gravitational forces, while water stored in the water tank can be in turn gravitationally fed to the anode side of the electrolyzer (where electrons are produced) through line or conduit 17. During operation of the electrolyzer 16, oxygen produced at the electrolyzer's anode (not shown) passes through line 17 and into water tank 14.

In the preferred embodiment, the individual cells of both the fuel cell and electrolyzer will be stacked in the horizontal direction with the electrodes and proton exchange membranes (PEMS) oriented vertically. These individual cells are wired in a series arrangement. The number of cells in this series is determined by the desired dc voltage to which this device will be connected. Under fully charged (3,000 psi) conditions the open circuit dc voltage of each individual cell is approximately 1.3 volts while under fully discharged conditions (100 psia) the open circuit dc voltage of each cell is approximately 1.2 volts.

Figure 4:
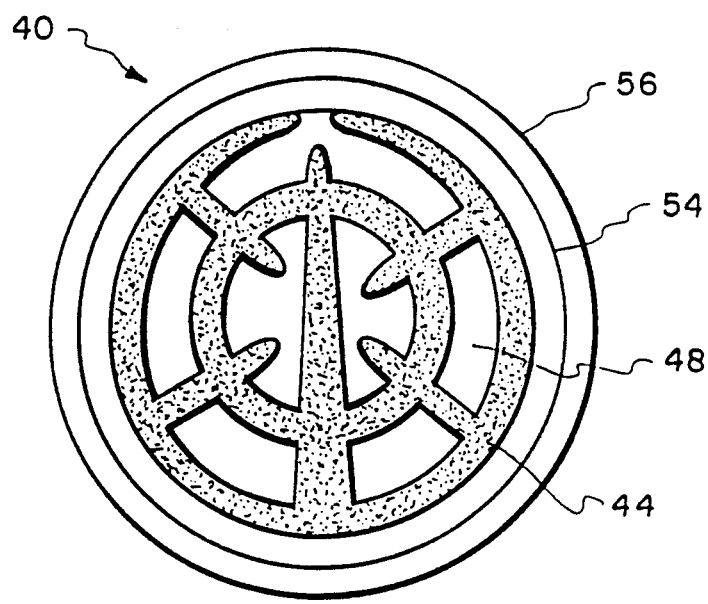
FIG. 4 is a front view of the wicked anode (hydrogen side) face of an individual fuel cell's electrochemical unit element. A typical wick pattern which allows for direct PEM electrolyte membrane exposure to the hydrogen gas is shown.
Figure 5:
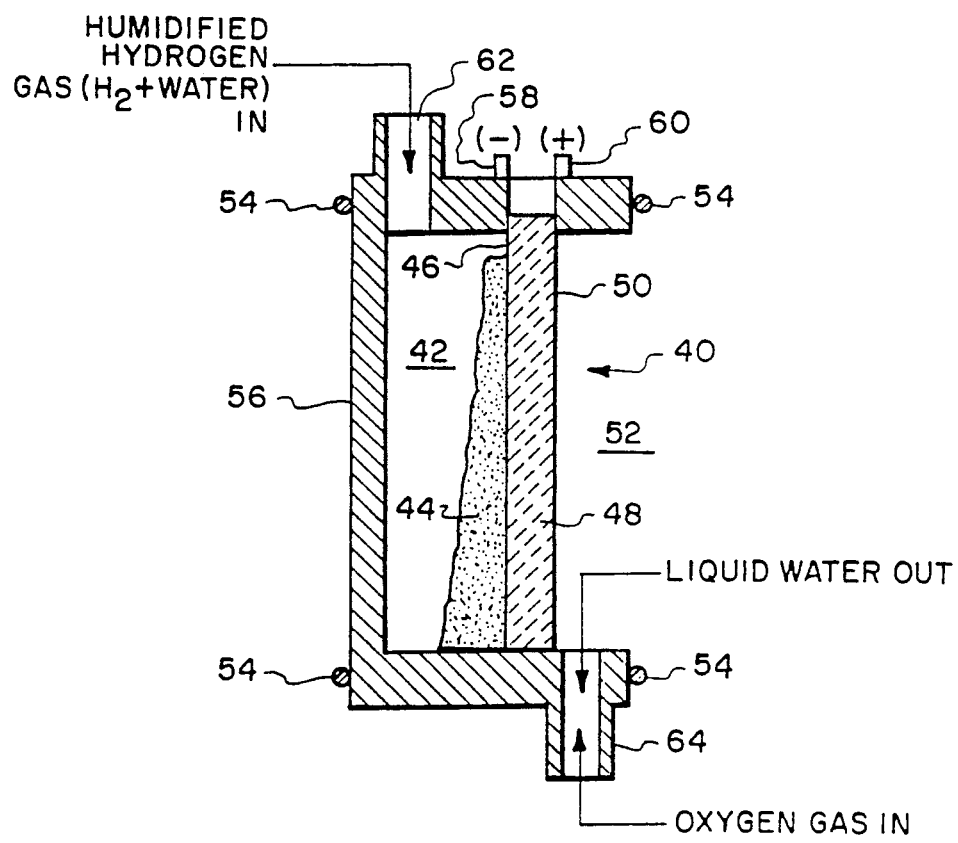
FIG. 5 is a side view of an individual fuel cell's electrochemical element showing (from left to right) the hydrogen or anode gas cavity, the anode wick, the anode screen electrode, the PEM electrolyte membrane, the cathode screen electrode, and the cathode or oxygen gas cavity.

The fuel cell system 10 thus far described has in the fuel cell 12 (FIG. 1) a wicked anode electrochemical unit cell assembly 40 as shown in FIGS. 4 and 5. The wicked anode electrochemical cell assembly 40 comprises a hydrogen or anode gas cavity 42, an anode wick 44, an anode screen (or metal particle) electrode 46, a PEM electrolyte membrane 48, a cathode screen (or metal particle) wet proofed electrode 50, and a cathode or oxygen gas cavity 52. The electrochemical cell's structural housing 56 also contains an anode passage 62 for admitting saturated hydrogen gas with entrained water droplets, and a cathode passage 64 for admitting saturated oxygen gas while draining liquid reaction product water. The anode screen electrode 46 is connected to the cell's negative terminal 58 while the cathode screen electrode 50 is connected to the cell's positive terminal 60. Both terminals and screen electrodes are electrically insulated from the cell's structural housing 56. Each individual unit cell assembly 40 is stacked in series with other individual unit cell assemblies using O-ring seals 54. The entire series arrangement is held together by mechanical compressive forces applied at the ends of the stack. Indirect cooling of each individual electrochemical cell 40 is achieved by adding a cooling cavity (not shown) between each individual unit cell 40 in the stack. The wick's function is to prevent dryout, devolatilization, and cracking of the PEM's anode side during brief periods of water feed interruption to the anode gas cavity 42 which is possible due to the passive operating nature of this electrochemical device. This is accomplished by holding a reservoir of excess water in close contact with the fuel cell's PEM anode surface. Dryout occurs due to the fact that aqueous protons migrating across the PEM electrolyte 48 (from anode side to cathode side) during normal fuel cell operation carry liquid water molecules along with them which if not replenished will lower the water concentration on the PEM anode surface. Any PEM dryout at high cell pressures will quickly lead to electrolyte oxidation and subsequent fuel cell failure. It shall also be appreciated that the anode wick 44 shown in FIG. 4 covers only a portion of the anode side PEM/electrode surface. This partial coverage is required in order to maximize fuel cell efficiency by allowing for intimate contact of the anode side PEM/electrode surface with gaseous hydrogen so that mass diffusion resistances within the cell are minimized. The anode wick 44 is sized to evenly distribute the liquid water initially transported into the hydrogen anode gas cavity 42 by the incoming humidified hydrogen gas stream over the entire PEM's anode side surface.

Figure 6:
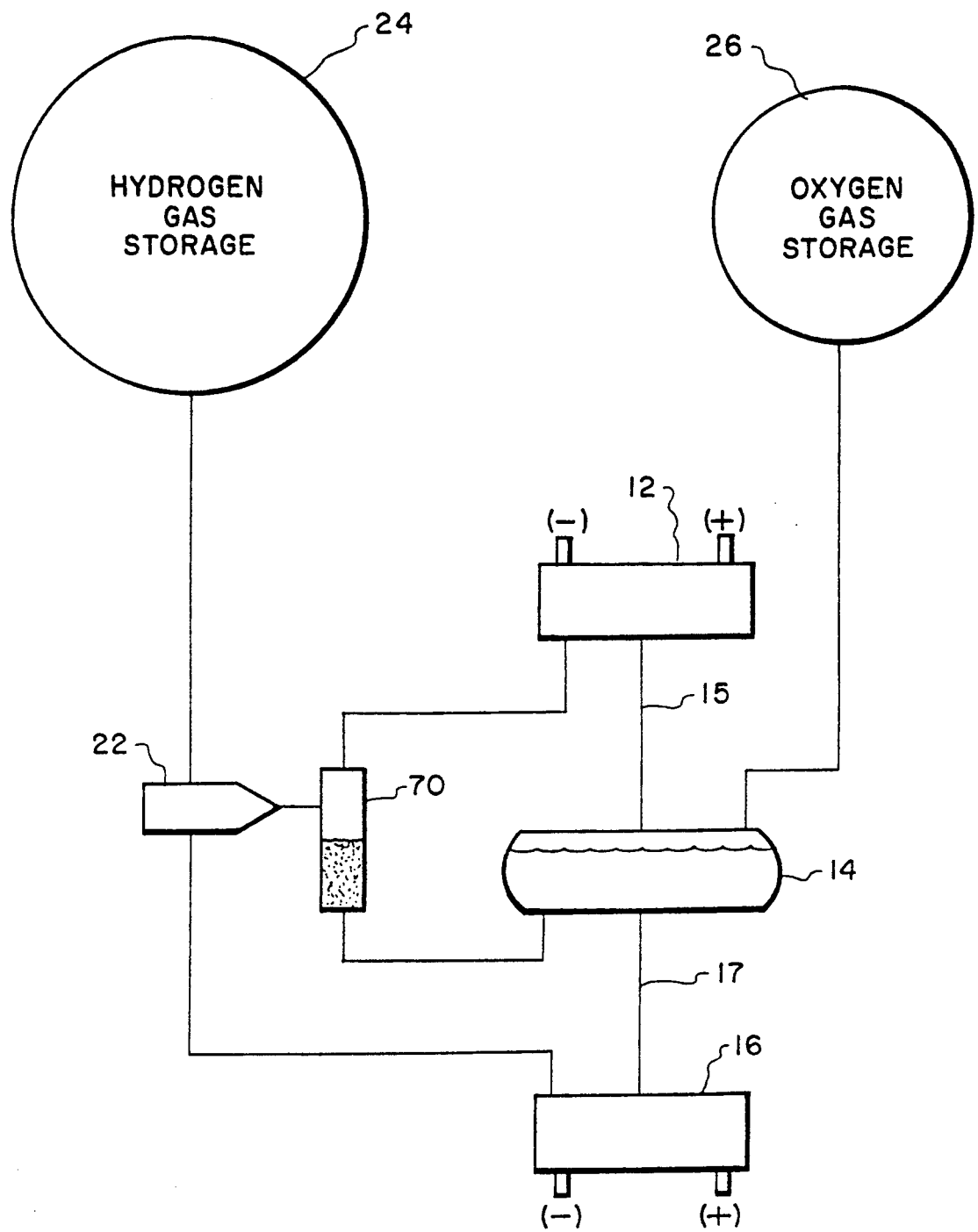
FIG. 6 is a schematic view of the regenerative fuel cell system of the present invention depicting an embodiment whereby a secondary water tank and orifice (or flow valve) have been replaced by a fiber packed column.
Figure 7:
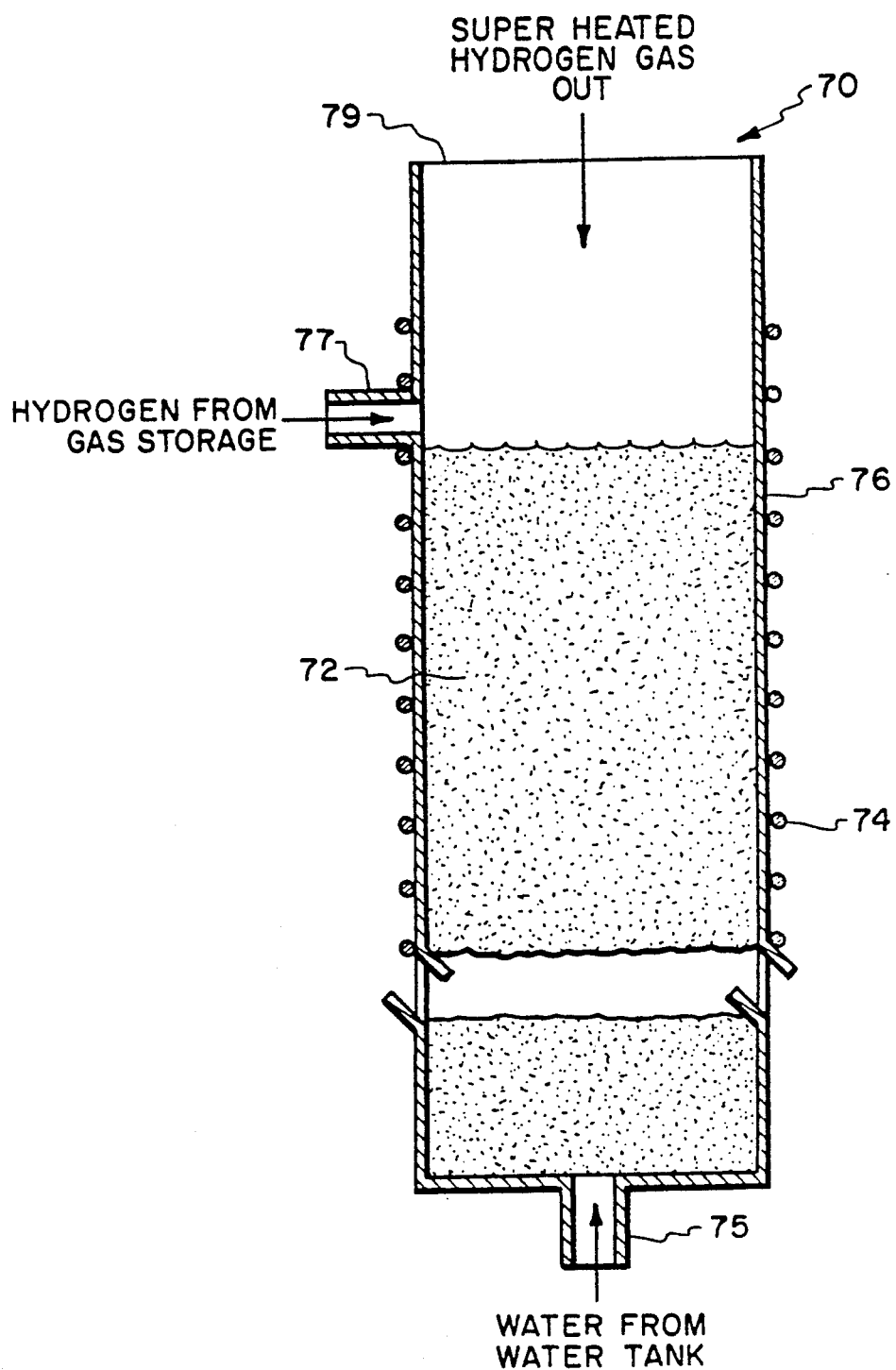
FIG. 7 depicts the fiber packed column assembly of a preferred embodiment which is designed to pump water into a higher pressure hydrogen gas stream using evaporative heating.

In a preferred embodiment, the secondary water tank 18 and orifice 20 (See FIGS. 1 and 2) are replaced with a fiber packed column 70 as shown in FIGS. 6 and 7. Fiber packed column 70 is composed of a fibrous wick material 72 such as cellulose fibers, sintered metal bed, cotton, and the like, which can develope a 10 psi hydrostatic head, contained inside the column's structural housing 76. The column's structural housing 76 is wrapped with electrical resistance heater wire 74 and the entire assembly is enclosed by thermal insulation material (not shown). The bottom of structural housing 76 contains an opening 75 for admitting liquid water which is pumped to the top of the wick 72 by capillary action. The side of structural housing 76 at the wick's location also contains an opening 77 for admitting gaseous hydrogen from the hydrogen storage tank 24. An opening 79 at the top of structural housing 76 allows for humidified, saturated, or superheated hydrogen gas to exit the fiber packed column assembly. Electrical heater wire 74 supplies the heat necessary to transport water from the lower pressure wick reservoir 72 into the higher pressure hydrogen gas stream.

Returning to the first embodiment of this invention, the operation thereof generally proceeds as follows. First, the entire system is drained and evacuated to remove all free liquids and gasses from its internal cavities. Next, the water tank 14 is completely filled with demineralized water. Upon completion of filling, the electrolyzer 16 is energized from an external dc power source (not shown), and the hydrogen and oxygen storage tanks 24 and 26 are charged with their respective gases by the electrolysis of water. Charging continues until the water tank is near empty. Once the regenerative fuel cell is completely charged, the fuel cell electrical power buses are ready for connection to an external load to deliver electrical power upon demand.

The hydrogen and oxygen storage tanks are designed to accept a stoichiometric ratio of hydrogen and oxygen (equivalence ratio equals 1.0) to a pressure of 3,000 psia and a temperature of 289° K. The active heating and cooling systems in these storage tanks (see FIGS. 2 and 3) are designed to not only maintain the tank temperatures near 289° K. but to also control the flow of reactant water through the orifice or valve 20 between the main and secondary water storage tanks 14 and 18 by varying the pressure differential across the orifice. Reactant water is passed back and forth through this valve in order to send liquid water to the anode side of the fuel cell's electrolyte 48 (See FIG. 5), thus preventing PEM dry-out, during power production operation. During electrical recharging operation, reactant water from the hydrogen side of the electrolyzer's electrolyte is returned to the main water tank through this valve. This movement of water is achieved by adjusting the temperature differential between the two tanks.

For example, when the regenerative fuel cell system is delivering power to an external electrical load, the temperature in the oxygen tank will be controlled above the hydrogen tank temperature. Hence, the oxygen tank pressure will be greater than the hydrogen tank pressure and water will flow out of the main water tank 14, through the secondary water tank 18 and into the anode chamber of the fuel cell 42 (See FIG. 5). When the regenerative fuel cell system is connected to a power source (not shown) for recharging, the temperature in the oxygen tank will be controlled to a value below the hydrogen tank temperature. Now, the oxygen tank pressure will be less than the hydrogen tank pressure so that water which is being generated on the hydrogen side of the electrolyzer will flow through the secondary water tank 18 and back into the main water tank 14 for storage and subsequent reaction.

Figure 3:
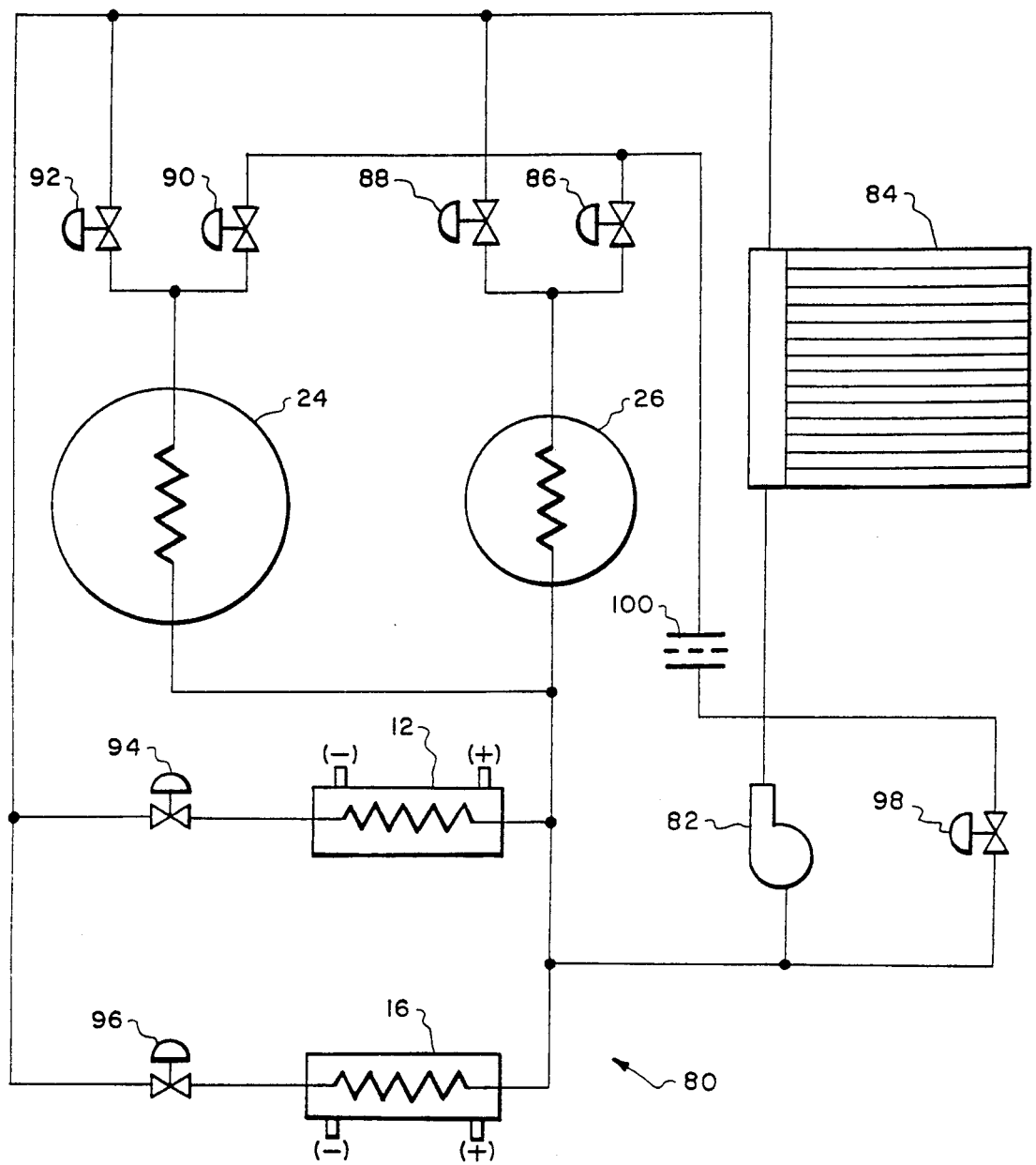
FIG. 3 depicts the primary regenerative fuel cell system coolant subsystem for controlling the liquid coolant flow distribution to the hydrogen storage tank, the oxygen storage tank, a waste heat radiator, fuel cell, and electrolyzer.

A complete self-contained liquid coolant subsystem 80 for causing this back and forth flow of reactant water through orifice 20 is shown in FIG. 3. This coolant subsystem uses the waste heat generated in both the fuel cell 12 and electrolyzer 16 for accomplishing this task. Coolant pump 82 continually recirculates a liquid coolant such as water through heat exchangers contained inside the radiator 84, the hydrogen gas storage tank 24, the oxygen gas storage tank 26, the fuel cell 12, and the electrolyzer 16. Valves 86, 88, 90, 92, 94, and 96 split the flow of liquid coolant being discharged from pump 82 to the proper components. Pump bypass valve, 98, controls the total flow rate being delivered to components 12, 16, 24, 26, and 84 while orifice 100 is designed to match the coolant's hydraulic flow resistance across the radiator 84. Radiator 84 ultimately discharges all waste heat generated by the regenerative fuel cell system to the outside environment.

Figure 2:
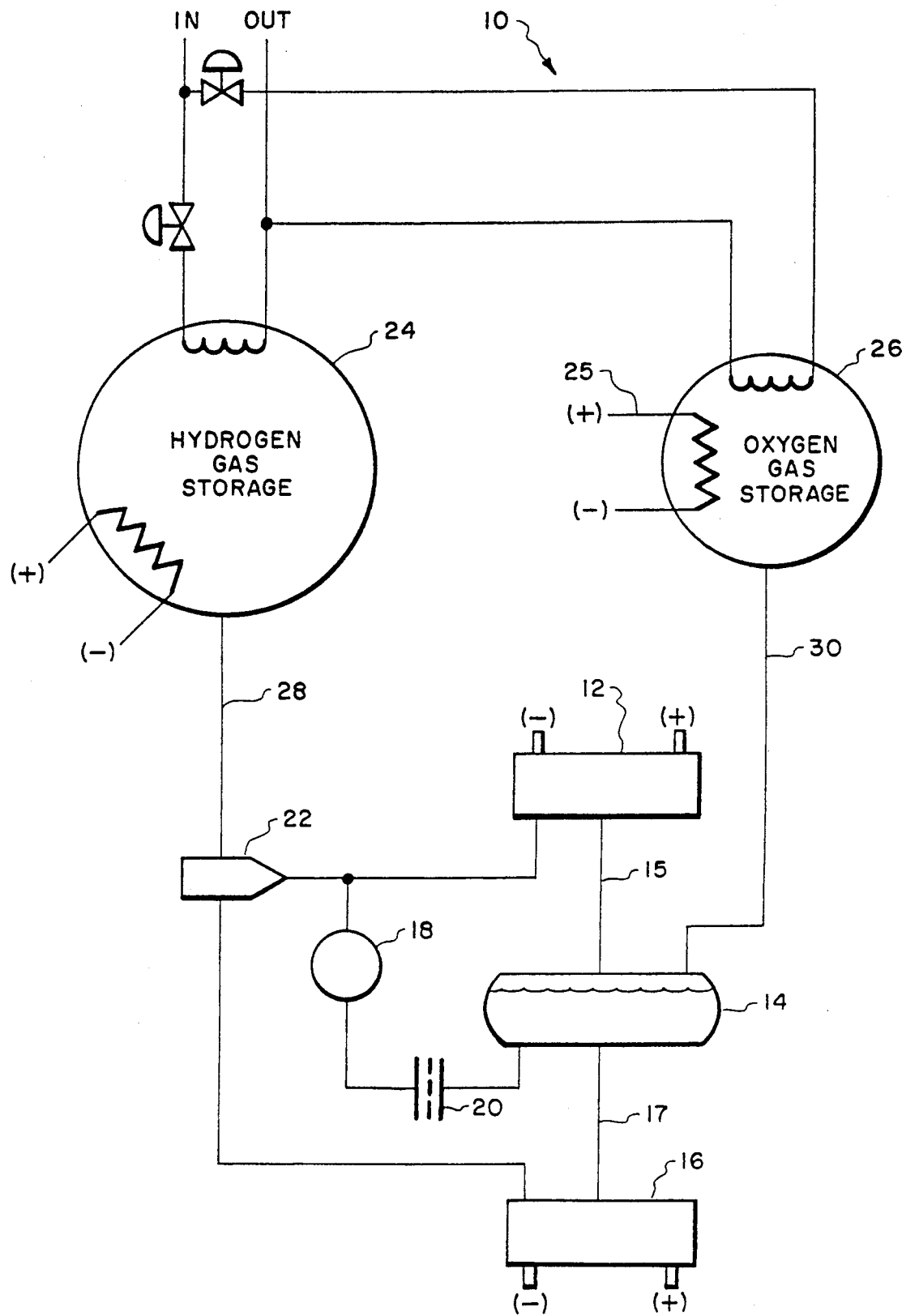
FIG. 2 republishes the schematic of FIG. 1 to define heating and cooling elements associated with hydrogen and oxygen gas storage containers.

When reactant water is desired to flow from the main water storage tank 14, into the secondary water tank 18 (See FIG. 1) during fuel cell 12 operation, liquid coolant valves 86, 92, and 94 are fully opened while valves 88, 90, and 96 are closed. This valve position arrangement will raise the oxygen gas temperature in storage tank 26 while lowering the hydrogen gas temperature in storage tank 24. This temperature differential will cause the gas pressure inside storage tank 26 to rise above the pressure inside storage tank 24 thus causing reactant water to flow from the main water tank 14 to the secondary water tank 18. When it is desired to cause the reactant water to flow from the secondary water tank 18 to the main water tank 14 during electrolyzer operation, liquid coolant valves 88, 90, and 96 are fully opened with valves 86, 92, and 94 closed. Should faster response times in producing temperature differentials between the hydrogen gas storage tank 24 and the oxygen gas storage tank 26 be desired, electrical resistance heating elements 25 can also be inserted into these tanks as shown in FIG. 2.

Operation of the preferred embodiment of this invention whereby the secondary water tank 18 and orifice 20 are replaced by the fiber packed column of FIGS. 6 and 7, generally proceeds as follows. First, the entire system is drained and evacuated to remove all free liquids and gasses from its internal cavities. Next the water tank 14 is completely filled with demineralized water. Upon completion of filling, the electrolyzer 16 is energized from an external dc power source (not shown), and the hydrogen and oxygen storage tanks 24 and 26 are charged with their respective gases by the electrolysis of water. Charging continues until the water tank is near empty. Once the regenerative fuel cell is completely charged, the fuel cell electrical power buses are ready for connection to an external load to deliver electrical power upon demand.

The hydrogen and oxygen storage tanks are designed to accept a stoichiometric ratio of hydrogen and oxygen (equivalence ratio equals 1.0) to a pressure of 3,000 psia and a temperature of 289° K. The active heating and cooling systems in these storage tanks (See FIGS. 2 and 3) are designed to not only maintain the tank temperatures near 289° K. but to also insure that the pressure inside the hydrogen gas storage tank 24 is always greater than the pressure inside the oxygen gas storage tank 26 by approximately 10 psi. This is accomplished by controlling the temperature in the hydrogen gas storage tank to always be somewhat higher than the oxygen gas storage tank. This will insure that reactant water can be transported from the water tank 14 through the electrically heated fiber packed column 70 (See FIG. 6) and into the anode side of the fuel cell's electrolyte 48 (See FIG. 5) thus preventing PEM dry-out during power production operation. During electrical recharging operation, reactant water from the hydrogen side of the electrolyzer's electrolyte is readily returned to the main water tank 14 through the fiber packed column 70 after its electrical heaters have turned off to eliminate all evaporative boiling.

The amount of water being thermally pumped to the fuel cell's anode gas cavity 42 during power production operation is controlled by the amount of heat transferred into the wick 72 of the fiber packed column 70 from the electrical resistance wire 74 (See FIG. 7). Increasing the electrical power to the resistance wire 74 will cause more water to enter the hydrogen gas stream. Depending on the amount of heat added, the hydrogen gas exiting the fiber packed column can contain water vapor at humidified, saturated, or high temperature superheated conditions. This added water vapor will be subsequently condensed back into the liquid form upon entering the cooler fuel cell's anode gas cavity 42. The actual flow rate of water to be transported to the fuel cell's anode gas cavity 42 will be only that amount necessary to prevent the fuel cell's PEM electrolyte from drying out since evaporative boiling in the fiber packed column represents an overall system efficiency loss.

A complete self contained liquid coolant subsystem 80 for controlling the hydrogen gas storage tank pressure above the oxygen gas storage tank pressure thereby allowing the fiber packed column 70 to operate as described above is shown in FIG. 3. This coolant subsystem uses the waste heat generated in both the fuel cell 12 and electrolyzer 16 for accomplishing this task. Coolant pump 82 continually recirculates a liquid coolant such as water through heat exchangers contained inside the radiator 84, the hydrogen gas storage tank 24, the oxygen gas storage tank 26, the fuel cell 12, and the electrolyzer 16. Valves 86, 88, 90, 92, 94, and 96 split the flow of liquid coolant being discharged from pump 82 to the proper components. Pump bypass valve 98 controls the total flow rate being delivered to components 12, 16, 24, 26, and 84 while orifice 100 is designed to match the coolant's hydraulic flow resistance across the radiator 84. Radiator 84 ultimately discharges all waste heat generated by the regenerative fuel cell system to the outside environment.

Now when the pressure differential from the hydrogen gas storage tank 24 to the oxygen gas storage tank 26 drops below approximately 10 psi ,liquid coolant valves 88 and 90 are fully opened while valves 86 and 92 are closed. Valve 94 is opened only during periods of fuel cell 12 operation while valve 96 is opened only during periods of electrolyzer 16 operation. This valve arrangement will cause the pressure in storage tank 24 to rise in relation to the pressure in storage tank 26 by increasing storage tank 24's temperature relative to storage tank 26's. Should the pressure differential from the hydrogen gas storage tank 24 to the oxygen gas storage tank 26 rise above approximately 10 psi, liquid coolant valves 86 and 92 are fully opened while valves 88 and 90 are closed. This valve arrangement will cause the pressure in storage tank 24 to drop in relation to the pressure in storage tank 26 by lowering storage tank 24's temperature relative to storage tank 26's. Should faster response times in producing tyemperature differentials between the hydrogen gas storage tank 24 and the oxygen gas storage tank 26 be desired, electrical resistance heating elements 25 can also be inserted into these tanks as shown in FIG. 2.

It will, of course, be realized that various modifications can be made to the present invention without departing from the spirit thereof. Thus, while the design and mode of operation of the invention has been explained, it should be understood that within the scope of the appended claims, the invention can be practiced otherwise than as specifically illustrated and described.

What is claimed is:

1. A method for controlling process water used in a variable pressure passive regenerative fuel cell system including a fuel cell and an electrolyzer comprising:
   (a) configuring the fuel cell system to position a water tank intermediate a fuel cell and an electrolyzer such that the fuel cell is above the water tank and the electrolyzer below the water tank whereby water produced by the fuel cell is gravity feed to the water tank and oxygen produced at the electrolyzer's anode ascends into the water tank;
   (b) further configuring the fuel cell system to include means communicating with said water storage tank for supplying water to an anode cavity of an anode component of said fuel cell; and
   (c) providing a fiber packed column structure for controlling the flow of water to said main water tank, and fuel cell during fuel cell system operation.

2. The method of claim 1 wherein said means communicating with said main water storage tank and said fuel cell comprises a conduit.

3. The method of claim 1 wherein said means for controlling the flow of water to said water tank and fuel cell further comprises:
   an active heating and cooling systems associated with hydrogen and oxygen storage tanks of said fuel cell system such that the flow of reactant water through the fiber packed column structural housing is controlled by selectively functioning the active heating and cooling system and the electrical resistance heater wire encasing the fiber packed column structural housing.

4. The method of claim 3 wherein said hydrogen and oxygen storage tanks are maintained at 289° K.

5. The method of claim 3 wherein the temperature in the hydrogen gas storage tank is higher than the temperature in the oxygen gas storage tank.

* * * * *